(12) United States Patent
Pepin et al.

(10) Patent No.: US 7,325,226 B2
(45) Date of Patent: Jan. 29, 2008

(54) MODULAR OBJECT SERIALIZATION ARCHITECTURE

(75) Inventors: Brian Keith Pepin, Seattle, WA (US); Shawn Patrick Burke, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 10/600,256

(22) Filed: Jun. 19, 2003

(65) Prior Publication Data

US 2004/0261008 A1 Dec. 23, 2004

(51) Int. Cl.
*G06F 9/44* (2006.01)

(52) U.S. Cl. ............... 717/108; 717/113; 717/116; 717/120

(58) Field of Classification Search .......... 717/108
See application file for complete search history.

(56) References Cited

U.S. PATENT DOCUMENTS

| | | | |
|---|---|---|---|
| 5,675,801 A | 10/1997 | Lindsey | 395/702 |
| 5,946,493 A | 8/1999 | Hanson | 395/709 |
| 5,956,728 A * | 9/1999 | Federighi et al. | 707/103 R |
| 6,052,691 A * | 4/2000 | Ardoin et al. | 707/102 |
| 6,059,838 A | 5/2000 | Fraley et al. | 717/1 |
| 6,263,492 B1 | 7/2001 | Fraley et al. | 717/5 |
| 6,292,938 B1 | 9/2001 | Sarkar et al. | 717/6 |
| 6,501,852 B1 | 12/2002 | Clark et al. | 382/166 |
| 6,928,488 B1 * | 8/2005 | de Jong et al. | 709/246 |
| 7,020,641 B2 | 3/2006 | Leong et al. | |
| 7,096,419 B2 * | 8/2006 | Barnes et al. | 715/513 |
| 2003/0088708 A1 | 5/2003 | Lewallen | 709/315 |
| 2003/0093770 A1 * | 5/2003 | Fernandez | 717/118 |
| 2003/0191803 A1 * | 10/2003 | Chinnici et al. | 709/203 |

FOREIGN PATENT DOCUMENTS

WO   WO 00/55727   9/2000

OTHER PUBLICATIONS

Salo, Timo; Hill, Justin; Rich, Scott; Bridgham, Chuck; and Berg, Daniel; "Object Persistence Beyond Serialization,"; *Dr. Dobb's Journal*; May 1999; vol. 24, No. 5; p. 19, 22, 24-7, 30-3.

(Continued)

*Primary Examiner*—Tuan Dam
*Assistant Examiner*—Michael J Yigdall
(74) *Attorney, Agent, or Firm*—Workman Nydegger (57) ABSTRACT

Methods, systems, and computer program products to serialize user interface objects having custom object types and serialization formats. A serialization manager may coordinate standard serialization providers to identify standard serializers for standard object types or serialization formats, and as needed, may be extended by loading custom serialization providers to identify custom serializers for custom object types or serialization formats, which may not be covered by the standard serialization providers. From available serialization providers, the serialization manager identifies a serializer for a particular serialization format and object type. The object, custom or standard, is serialized using the identified serializer to a custom or standard format, including source code representations, XML representations, etc. Certain serialization formats produce a snippet of code without producing a class representation of an object; to help coordinate and enhance modularity among serializers and their providers; the serialization manager may maintain and share context information.

40 Claims, 4 Drawing Sheets

OTHER PUBLICATIONS

Darby, Chad; "Object Serialization in Java 1.1: Making Objects Persistent,"; *WEB Techniques;* Sep. 1997; vol. 2, No. 9 *available at* www.webtechniques.com/ archives/1997/09/darby.

Lorenz, David H. and Petkovic, Predrag; "Design-Time Assembly of Runtime Containment Components," Proceedings of the 34th International Conference on Technology of Object-Oriented Languages and Systems—TOOLS 34; Jun. 30-Aug. 4, 2000; p. 195-204.

Kienzle, J. and Romanovsky, A.; "Framework Based on Design Patterns for Providing Persistence in Object-Oriented Programming Languages,"; *IEE Proceedings-Software;* Jun. 2002; vol. 149, No. 3; p. 77-85.

Carpenter, Bryan; Fox, Geoffrey; Sung Hoon Ko; and Sang Lim; "Object Serialization for Marshaling Data in a Java Interface to MPI,"; *Concurrency: Practice and Experience*; vol. 12, No. 7; p. 539-53, 1999.

Spreitzer, Mike and Begel, Andrew; "More Flexible Data Types,"; Proceedings of the IEEE 8th International Workshops on Enabling Technologies: Infrastructure for Collaborative Enterprises (Wet Ice '99); Jun. 16-18, 1999; p. 319-24.

Opyrchal, L. and Prakash, A.; "Efficient Object Serialization in Java,"; Proceedings of the 19th IEEE International Conference on Distributed Computing Systems. Workshops on Electronic Commerce and Web-based Applications; May 31-Jun. 4, 1999; p. 96-101.

Philippsen, Michael and Haumacher, Bernhard; "More Efficient Object Serialization,"; Parallel and Distributed Processing, 11th IPPS/SPDP'99 Workshops Held in Conjunction with the 13th International Parallel Processing Symposium and 10th Symposium on Parallel and Distributed Processing; Apr. 12-16, 1999; p. 718-32.

Beveridge, Jim; "Inside MFC Serialization,"; *Dr. Dobb's Journal*;Oct. 1995; vol. 20, No. 10; p. 62, 64, 66-7, 122-3.

Printezis, Tony; "Orthogonal Persistence: the Future for Storing Objects?"; PAJava 99 Proceedings of the First International Conference on the Practical Application of Java; Apr. 21-23, 1999; p. 5-17.

* cited by examiner

MODULAR OBJECT SERIALIZATION ARCHITECTURE

CROSS-REFERENCE TO RELATED APPLICATIONS

N/A

BACKGROUND OF THE INVENTION

1. The Field of the Invention

The present invention relates to object serialization. More specifically, the present invention relates to methods, systems, and computer program products to serialize custom user interface objects in custom serialization formats.

2. Background and Related Art

In a broad sense, serialization is the conversion of an object from one representation or format to another. Serialization generally implies a two way process: converting an object from an initial representation to some other representation, and then converting that other representation back to the initial representation. Although at times, converting back to the initial representation may be referred to as deserialization, serialization is a generic term that encompasses both the initial conversion of the initial representation and the subsequent conversion back to the initial representation.

For example, in-memory or live objects may be serialized to persistent or transient objects that are suitable for durable storage or transmission over a network. Currently, it is common practice to use eXtensible Markup Language (XML) as a serialization format for both storage and data transmission. Once stored or transmitted, the XML representation of the object may be serialized (or deserialized) from the XML representation back to an in-memory or live object. The software that performs serialization typically is called a serializer.

Figure 1:
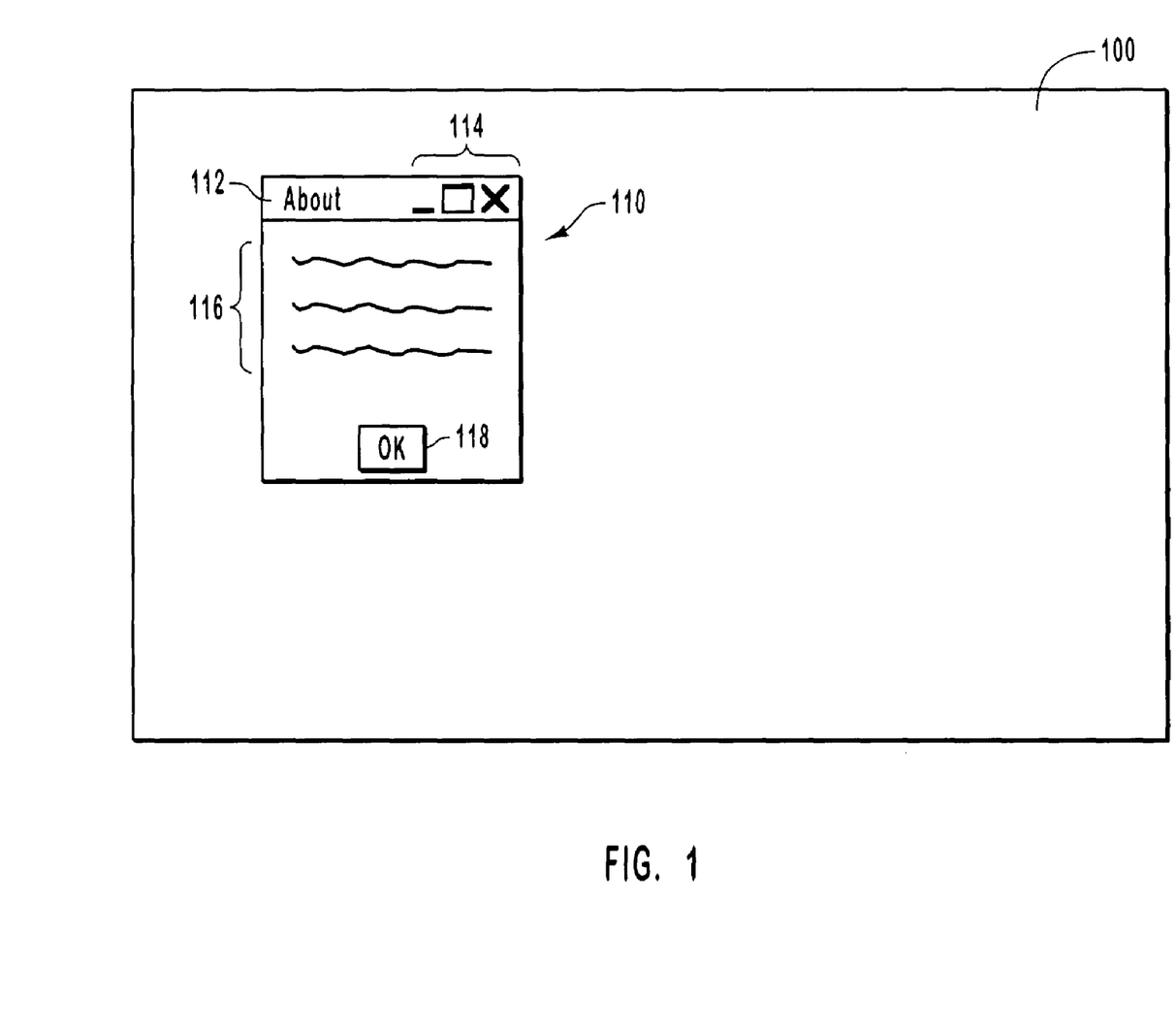
FIG. 1 illustrates an example visual user interface designer with an example user interface object that may be serialized in accordance with the present invention.

Code generation is another example of serialization. FIG. 1 illustrates an example visual user interface designer 100 with an in-memory or live user interface object 110. Visual user interface designer 100 allows a user to define the visual appearance of a user interface object and then generate a source code representation of the user interface object that can be compiled and included within a program. In this example, user interface object 110 is a simple about box, with a title 112 that identifies the object as an about box, window controls 114 for minimizing, maximizing and closing the about box, text 116, and an OK button 118 for dismissing the about box. Typical visual user interface designers generate code similar to the pseudo code that is shown in Table I.

TABLE I

```
Class About : form {
    label text;
    Button OK;
    public About( ) {
        text = new label( );
        OK = new Button( );
        text.location = new Point(0,0);
        text.text = ". . .";
        OK.location = new Point (100, 130);
        OK.text = "OK"
        Controls.Add(OK);
        Controls.Add(Text);
    }
}
```

The pseudo code in Table I illustrates several problems with conventional serialization within a visual user interface designer. First, conventional serialization within a visual user interface designer typically is limited to a single serialization format, such as code generation. While code generation is certainly a significant purpose for the visual user interface designer, other types of serialization may be desired. For example, an XML representation of the About box may be desirable, perhaps as a universal format that allows user interface objects created in one visual user interface designer to be imported into another visual user interface designer. However, conventional serialization within a visual user interface designer has been tightly coupled with a single format and has not allowed for different serialization formats.

A second problem illustrated by the pseudo code in Table I is that conventional serialization within a visual user interface designer typically produces a new class, like the new About class shown in Table I. For code generation, this is generally the desired behavior because it allows for straightforward interaction with member objects within the new class. However, for many operations, creating a new class when serializing leads to inefficiencies. For example, during much of the design time, only the visual representation of an object is relevant or is most relevant—source code is only necessary when the visual representation is saved to disk. Table It illustrates an equivalent representation for the pseudo code shown in Table I. The difference being that Table I creates a new type, whereas Table II configures an existing type. This second representation may not be useful as finished source code, but can be used within the visual designer as a generic way to persist live object state for features such as undo or copy and paste.

TABLE II

```
Form About = new form( );
label text = new label( );
Button OK = new Button( );
text.location = new Point(0,0);
text.text = ". . .";
OK.location = new Point (100, 130);
OK.text = "OK"
About.Controls.Add(OK);
About.Controls.Add(Text);
```

A third problem is that conventional serialization within a visual user interface designer generally is limited in how serializers are extended for new types and/or new serialization formats. While it was possible to call a serialization provider for a new type or format, conventional serialization required a metadata attribute to be compiled into a type for the serialization provider to be known. Accordingly, recompilation is required to provide new serialization formats and to serialize new object types that were not preconceived by an object's developer. Aside from being inconvenient, recompilation may not be possible in some circumstances, such as when third party objects are serialized.

Of course, it should be noted that a visual user interface designer is merely one example of software that generates code for a graph of objects. In many circumstances, code generation may be the fastest and most efficient way to recreate a graph of objects. As illustrated above, however, conventional serialization, particularly where code generation is concerned, suffers from various shortcomings that limit its usefulness.

BRIEF SUMMARY OF THE INVENTION

The present invention relates to methods, systems, and computer program products to serialize objects having custom object types and serialization formats. In accordance with example embodiments of the present invention, a serialization manager coordinates standard serialization providers to identify standard serializers for standard object types or serialization formats. As needed, the serialization manager may be extended by loading custom serialization providers to identify custom serializers for custom object types or serialization formats that may not be covered by the standard serialization providers. From the available serialization providers, the serialization manager identifies a serializer for a particular serialization format and object graph. Once a suitable serializer has been identified, the object graph is serialized using the serializer.

The object graph may contain a plurality of related objects, which may be custom or standard object types, and the serialization format may be a standard or custom format. Example serialization formats include live or in-memory representations, source code representations, eXtensible Markup Language (XML) representations, etc. Certain serialization formats may produce a snippet of code for an object graph without producing a class a representation of the object graph. These snippets of code are particularly useful for cut/copy/paste and undo/redo operation within a visual user interface designer. In some implementations, serializers from the custom serialization providers may be used to replace standard serializers. To help coordinate and enhance modularity among serializers and their providers, the serialization manager may maintain and share context information.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for serializing user interface objects having custom object types and serialization formats. The embodiments of the present invention may comprise one or more special purpose and/or one or more general purpose computers including various computer hardware, as discussed in greater detail below.

Figure 2:
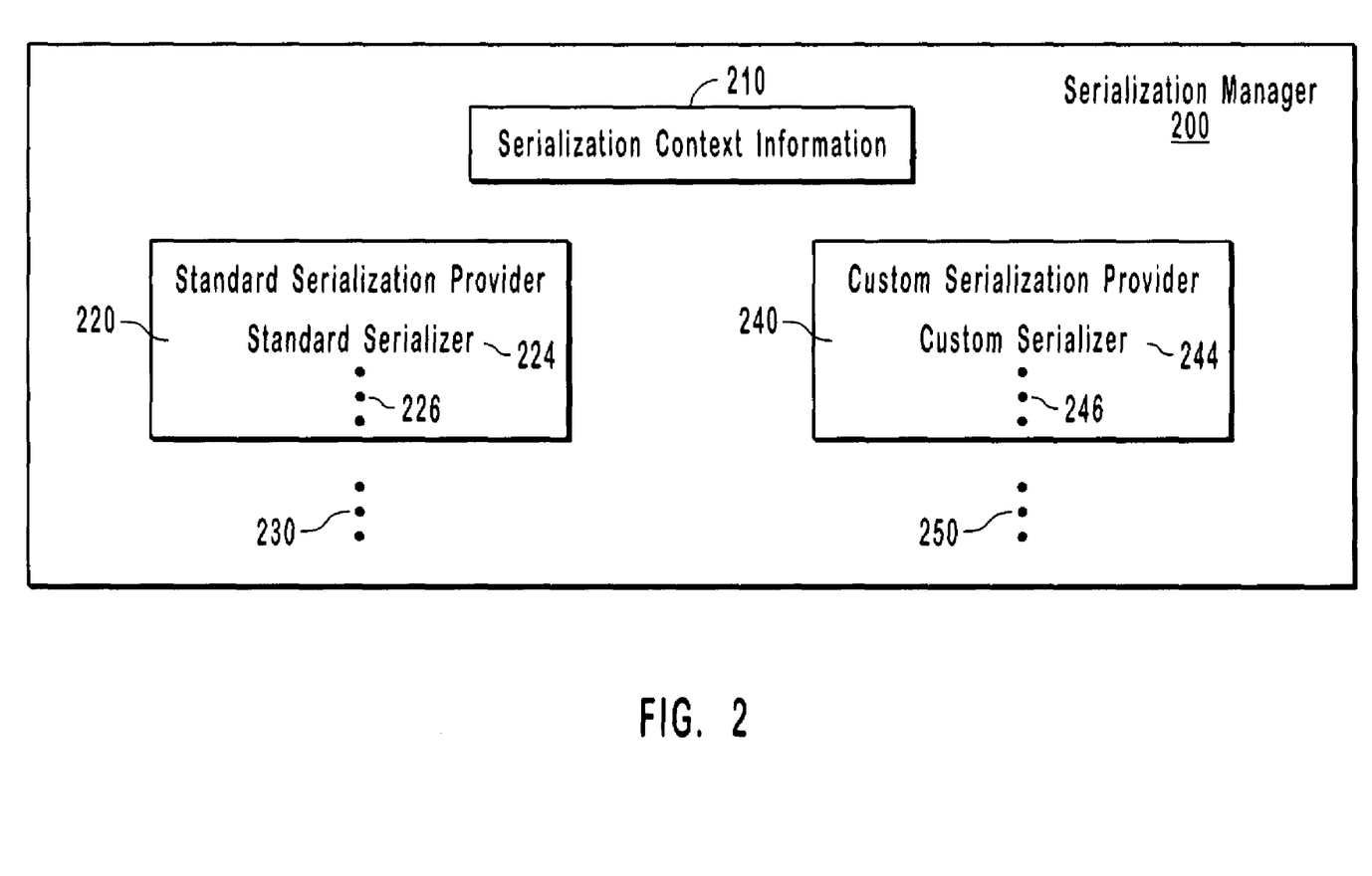
FIG. 2 illustrates an example serialization manager in accordance with the present invention.

FIG. 2 illustrates an example serialization manager 200 in accordance with the present invention. Serialization manager 200 includes a standard serialization provider 230 with standard serializer 224 and a custom serialization provider 240 with a custom serializer 244. A serializer, such as standard serializer 224 or custom serializer 244, is an object that is capable of serializing a particular object type or range of object types to a particular serialization format. Generally, different serializers are used for serializing a single object type to different serialization formats, and in some implementations separate base classes exists for serialization providers offering distinct serialization formats. For example, as described in further detail below, an XmlSerializer base class may be used to convert objects to eXtensible Markup Language (XML). Different serializers and serialization providers also may be used to serialize different object types to a single serialization format.

Serialization providers, such as standard serialization provider 220 and custom serialization provider 240, identify individual serializers for a particular object type and serialization format. For example, standard serialization provider 220 may identify standard serializer 224 to serialize a standard object to a standard serialization format. Other standard serializers 226 may be used for serializing different object types to the same standard serialization format, or for serializing the standard object type to different standard serialization formats. Similarly, custom serialization provider 240 may identify custom serializer 244 to serialize a custom object to a custom serialization format, and other custom serializers 246 may be used for serializing different object types to the same custom serialization format, or for serializing the same custom object to different custom serialization formats. Of course, serialization manager 200 may contain other standard serialization providers 230 as well as other custom serialization providers 250.

Serialization manager 200 also provides an information store of serialization context information 210 for the various serializers to use in serializing an object graph. For example, an object graph with multiple objects may need multiple serializers, each generating its own output. Serialization manager 200 facilitates communication between these serializers, as needed.

Within serialization manager 200, metadata attributes may be used to relate individual object types to particular serializers. For example, as described in greater detail below, a default serialization provider attribute may be used to load or install a serialization provider for object types that don't have serializers or to replace existing serializers. Within a serialization provider, such as standard serialization provider 220 or custom serialization provider 240, metadata attributes also may be used in identifying a suitable serializer for a given object type and serialization format.

As an example, consider the XML format shown in Table III.

TABLE III

```
<TypeName>
    <PropertyName>
        ValueString
    </PropertyName>
</TypeName>
```

This XML format is serialized using the pseudo code class, XmlSerializer, shown in Table IV.

TABLE IV

```
public abstract class XmlSerializer {
    public abstract string Serialize(
        IDesignerSerializerationManager m,
        object graph);
}
```

XmlSerializer is a modular class that builds up a string from smaller pieces. For example, XmlSerializer returns "5" when passed an Int32 data type with an integer value of five.

The XML format in Table III suggests two fundamental object types to serialize: objects with properties and objects that can be converted to text. For most circumstances, adorning every class with a custom serializer that knows how to convert that class to text or XML tags is too much effort and leads to maintenance problems when new serialization formats are introduced. (In order to serialize an existing class to a new serialization format, a new attribute is introduced into the class, which requires recompilation of the existing class.) Serialization providers address this problem through a callback mechanism where a provider is given an opportunity to provide a serializer for a given type.

For the current example, the available set of types have been restricted as follows:
1. If the type can be converted to a string through an existing IConvertible interface, StringXmlSerializer is identified.
2. If the type cannot be converted to a string, but is public and has an empty constructor, ObjectXmlSerializer is identified.
3. If neither of these is true, the serialization provider will return null, indicating that there is no serializer for the object. (How this error condition is handled is up to the calling serializer.)

Pseudo code implementing the above criteria is shown below in Table V.

TABLE V

```
internal class XmlSerializationProvider : IDesignerSerializationProvider {
    object GetSerializer(
        IDesignerSerializerationManager manager,
        object currentSerializer,
        Type objectType,
        Type serializerType) {
        //Null values are given a null type by this provider
        if (objectType = = null) {
            return StringXmlSerializer.Instance;
        }
        if (typeof(IConvertible).IsSubclassOf(objectType)) {
            return StringXmlSerializer.Instance;
        }
        if (objectType.GetConstructor(new object[ ]) = = null) {
            return ObjectXmlSerializer.Instance;
        }
        return null;
    }
}
```

After a serialization provider has been defined, it can be put to use. Although serialization manager 200 can be given this serialization provider through an explicit add method, this approach requires someone to make the explicit call. Alternatively, the serialization manager can be automatically added to serialization manager 200 by adding a DefaultSerializationProviderAttribute to the serializer base class. For this example, the attribute requires that the serialization provider have a public, empty constructor. Accordingly, the pseudo code in Table IV changes as shown below in Table VI.

TABLE VI

```
[DefaultSerializationProvider(typeof(XmlSerializationProvider))]
public abstract class XmlSerializer {
}
```

Now, whenever serialization manager 200 is asked for any type of XmlSeriaizer, the default serialization provider will be automatically added to the serialization manager if it has not been previously added. Note that this attribute is associated with the serializer rather than the object so that new serialization format may be added without having to recompile classes to make use of new attributes.

As indicated above, the example XmlSerializer has two concrete serializer classes: StringXmlSerializer and ObjectXmlSerializer. Table VII shows a pseudo code implementation of StringXmlSerializer.

TABLE VII

```
internal class StringXmlSerializer : XmlSerializer {
    internal StringXmlSerializer Instance = new StringXmlSerializer( );
    public override string Serialize(
        IDesignerSerializationManager m,
        object graph) {
        if (graph = = null) return string.Empty;
        IConvertible c = graph as IConvertible;
        if (c = = null) {
            // Rather than throwing excpetions, we can
            // add a list of errors to the serlialization
            // manager.
            m.ReportError("Object is not IConvertible");
            return null;
        }
        return c.ToString(CultureInfo.InvariantCulture);
    }
}
```

Table VIII shows a pseudo code implementation of ObjectXmlSerializer, which walks the public properties of the objects it serializes.

TABLE VIII

```
internal class ObjectXmlSerializer : XmlSerializer {
    internal ObjectXmlSerializer Instance = new ObjectXmlSerializer( );
    public override string Serialize(
        IDesignerSerializationManager m,
        object graph) {
        StringBuilder xml = new StringBuilder( );
        xml.Append("<");
        xml.Append(graph.GetType( ).FullName);
        xml.Append(">");
        // Now, walk all the properties of the object
        PropertyDescriptorCollection properties;
        Property p;
        properties = TypeDescriptor.GetProperties(graph);
        foreach(p in properties) {
            if (!p.ShouldSerializeValue(graph)) {
                continue;
```

TABLE VIII-continued

```
}
    object value = p.GetValue(graph);
    Type valueType = null;
    if (value != null) valueType = value.GetType( );
    // Get the serializer for this property
    XmlSerializer s = m.GetSerializer(
        valueType,
        typeof(XmlSerializer)) as XmlSerializer;
    if(s = = null) {
        // No serializer means we must skip this
        // property. Tell the serialization manager
        // of the error.
        m.ReportError(string.Format(
        "Property {0} does not support XML serialization",
        p.Name));
        continue;
    }
    // We have a valid property to write
    xml.Append("<");
    xml.Append(p.Name);
    xml.Append(">");
    xml.Append(s.Serialize(m, value);
    xml.Append("</");
    xml.Append(p.Name);
    xml.Append(">");
    }
    xml.Append("</");
    xml.Append(graph.GetType( ).FullName);
    xml.Append(">");
    return xml.ToString( );
    }
}
```

Note that ObjectXmlSerializer invokes other serializers for each property value. This has at least two advantages. First, it allows ObjectXmlSerializer to be very simple. Second, it provides an extensibility point for third party types. If a type comes along that cannot be written out by either of these serializers, a custom serializer can be provided for the type.

Table IX shows an example usage of the foregoing serializers for a System.Drawing.Rectangle object, which has an empty constructor and four properties that all support IConvertible for string conversion. In Table IX, an instance of IDesignerSerializationManager, a serialization manager, is created and asked to identify a serializer. The identified serializer then serializes the object.

TABLE IX

```
Rectangle r = new Rectangle(5, 10, 15, 20);
DesignerSerializationManager m = new DesignerSerializationManager( );
XmlSerializer x = (XmlSerializer)m.GetSerializer(
    r.GetType( ), typeof(XmlSerializer);
string xml = x.Serialize(m, r);
```

The example usage illustrated in Table IX produces the XML shown in Table X.

TABLE X

```
<System.Drawing.Rectangle>
<X>
5
</X>
<Y>
10
</Y>
<Width>
15
</Width>
<Height>
15
```

TABLE X-continued

```
</Height>
</System.Drawing.Rectangle>
```

Note that this example does not include any XML indenting. The indenting, however, could be easily accomplished through using the serialization context information 210 of serialization manager 200. Each serializer level could add an object to a context stack that contained the current indent level, and each serializer could then search for the level context object in the stack and use it to provide an appropriate indent.

Serialization manager 200 is capable of serializing an object to different serialization formats. In contrast to the foregoing XML serialization, the example below relates to a code generation format. Note that in accordance with example implementations of the present invention, serialization providers that generate XML and serialization providers that generate source code may coexist in serialization manager 200. As indicated previously with respect of FIG. 1, there are multiple ways to serialize an object to source code. Consider, for example, the case of a form with a single OK button. One standard way of defining such a form is shown below in Table XI.

TABLE XI

```
public class Form1 : Form {
    private Button button1;
    public Form1( ) {
        button1 = new Button( );
        button1.Location = new Point(100, 100);
        button1.Text = "OK";
        this.Controls.Add(button1);
    }
}
```

The pseudo code of Table XI defines a new class of a "Form1" object type. Having the root of the object graph define a new type, however, is an arbitrary choice. The code also could have been represented as shown in Table XII:

TABLE XII

```
Form Form1 = new Form( );
Button button1 = new Button( );
button1.Location = new Point(100, 100);
button1.Text = "OK";
Form1.Controls.Add(button1);
```

In both cases the result is a form with a button on it. However, the code snippet illustrated in Table XII generally is more desirable for all objects other than the "root" of the object graph, and is more useful for cut/copy/paste and undo/redo operations within a visual designer. For these operations, the creation of a new object, at least initially, may be unnecessary and undesirable, and therefore require some additional effort to avoid. In many cases, a form can just as easily be represented in the format shown in Table XII. Therefore, in an example implementation, serialization manager 200 has two different base serialization types: CodeDomSerializer, which merely creates and configures a given object, and TypeCodeDomSerializer, which defines a new type. Both serializers may coexist in serialization manager 200.

An example CodeDomSerializer class is shown below in Table XII.

TABLE XIII

```
public abstract class CodeDomSerializer {
    public abstract object Serialize(
        IDesignerSerializationManager m,
        object value);
    public virtual object SerializeProperty(
        IDesignerSerializationManager m,
        PropertyDescriptor p,
        object value);
    public abstract object Deserialize(
        IDesignerSerializationManager m,
        object state);
}
```

The Serialize method serializes the given object. Its return value depends on the type of serialization needed, and may be any one of the following:

CodeExpression: If the object can be serialized into a simple expression, a CodeExpression will be returned. Primitives fall into this category as do types that can be created and configured in their constructor.

CodeStatementCollection: If the object can be serialized into a collection of statements, a CodeStatementCollection will be returned. Complex objects that require construction and one or more properties to be set fall into this category.

The SerializeProperty method serializes a property on the given object. One model for using this type of serialization is as follows:
1. Ask the serialization manager for a serializer for the given property type.
2. Call SerializeProperty on the returned serializer.
3. Integrate the results into your own serialization data.

The return value for SerializeProperty depends on the type of serialization needed, and may be any one of the following:

CodeStatement: If the property can be serialized into a single statement, a CodeStatement will be returned. Most properties fall into this category CodeStatementCollection: If the property can be serialized into a collection of statements, a CodeStatementCollection will be returned. Complex properties such as collections may fall into this category.

The Deserialize method returns a live object configured from the given serialization data. The object passed in as "state" should be of the same type of object returned from a previous Serialize call.

The TypeCodeDomSerializer class performs the same tasks as a CodeDomSerializer, but serializing an object through this class defines a new type. An example Type-CodeDomSerializer class is shown below in Table XIV.

TABLE XIV

```
public abstract TypeCodeDomSerializer {
    public abstract CodeTypeDeclaration Serialize(
        IDesignerSerializationManager m,
        object root,
        ICollection members);
    public abstract object Deserialize(
        IDesignerSerializationManager m,
        CodeTypeDeclaration typeDecl);
}
```

The Serialize method serializes the given root object and an optional collection of members to create a new type definition. The members collection can be null or empty. If it contains values, these values will be defined as member variables on the type. For convenience, the members collection can contain the root object. In this case the root object will not also be added as a member. The Deserialize method deserializes a previously serialized code type declaration. It creates an instance of the type declaration's base type and configures it by setting properties and executing methods.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 3:
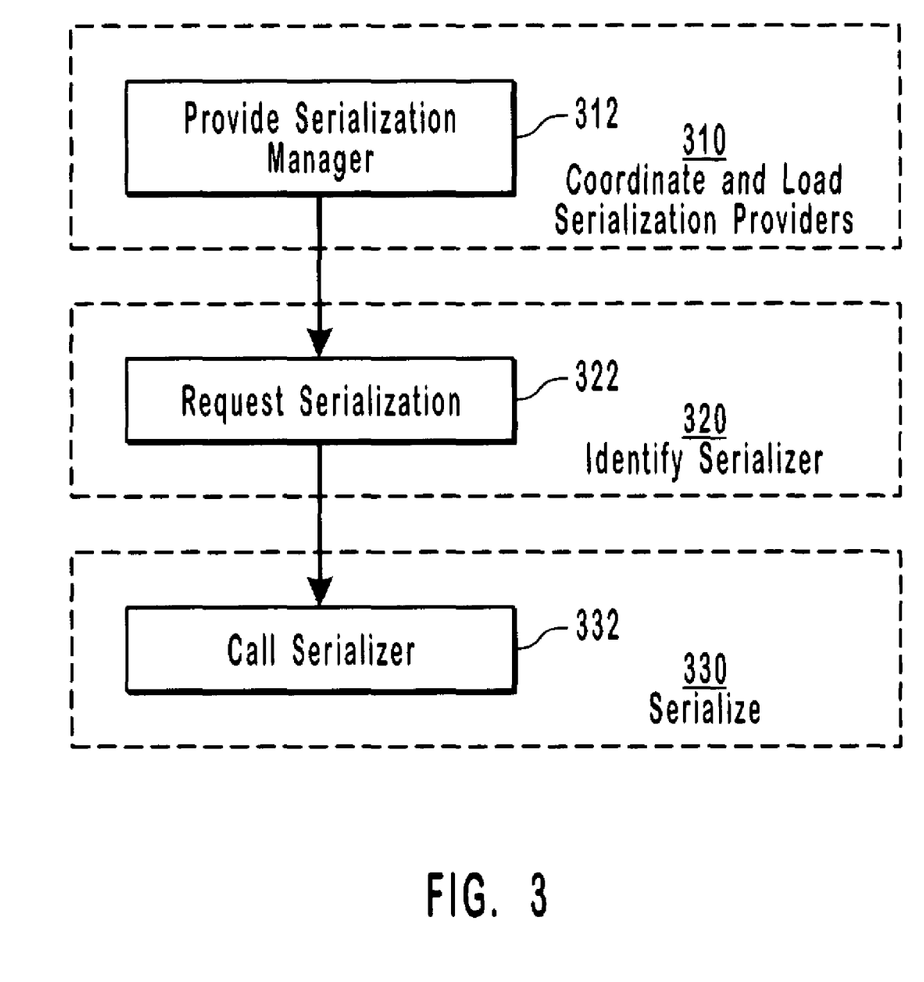
FIG. 3 shows example acts and steps for methods of serializing user interface objects in accordance with the present invention.

FIG. 3 shows example acts and steps for methods of serializing user interface objects in accordance with the present invention. A step for coordinating (310) one or more standard serialization providers that each identify one or more standard serializers for a standard object type or serialization format and a step for loading (310), as needed, one or more custom serialization providers that each identify one or more custom serializers for one or more custom object types or serialization formats that may not be covered by the one or more standard serialization providers may include an act of providing (312) a serialization manager.

A step for identifying (320) a serializer for a particular serialization format and for an object graph that comprises an object of a particular object type may include an act of requesting (322) a serializer from the serialization manager. A step for serializing (330) may include an act of calling (332) a serializer returned by the serialization manager to serialize an object graph. A step for maintaining (not shown) context information may include an act (not shown) of storing context information at the serialization manager. A step for replacing (not shown) a standard serializer with a custom serializer may include the act of providing (312) a serialization manager to load one or more custom serialization providers that each identify one or more custom serializers.

Custom serializers and serialization providers may be loaded in response to a request for a serializer. The object graph to be serialized may comprise a plurality of related objects. Serializers may produce snippets of code rather than class representations of an object graph as part of a cut/copy/paste or undo/redo operation. Serializers may serialize or deserialize an object graph, and may produce live or in-memory, XML, source code, or other representations of an object.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
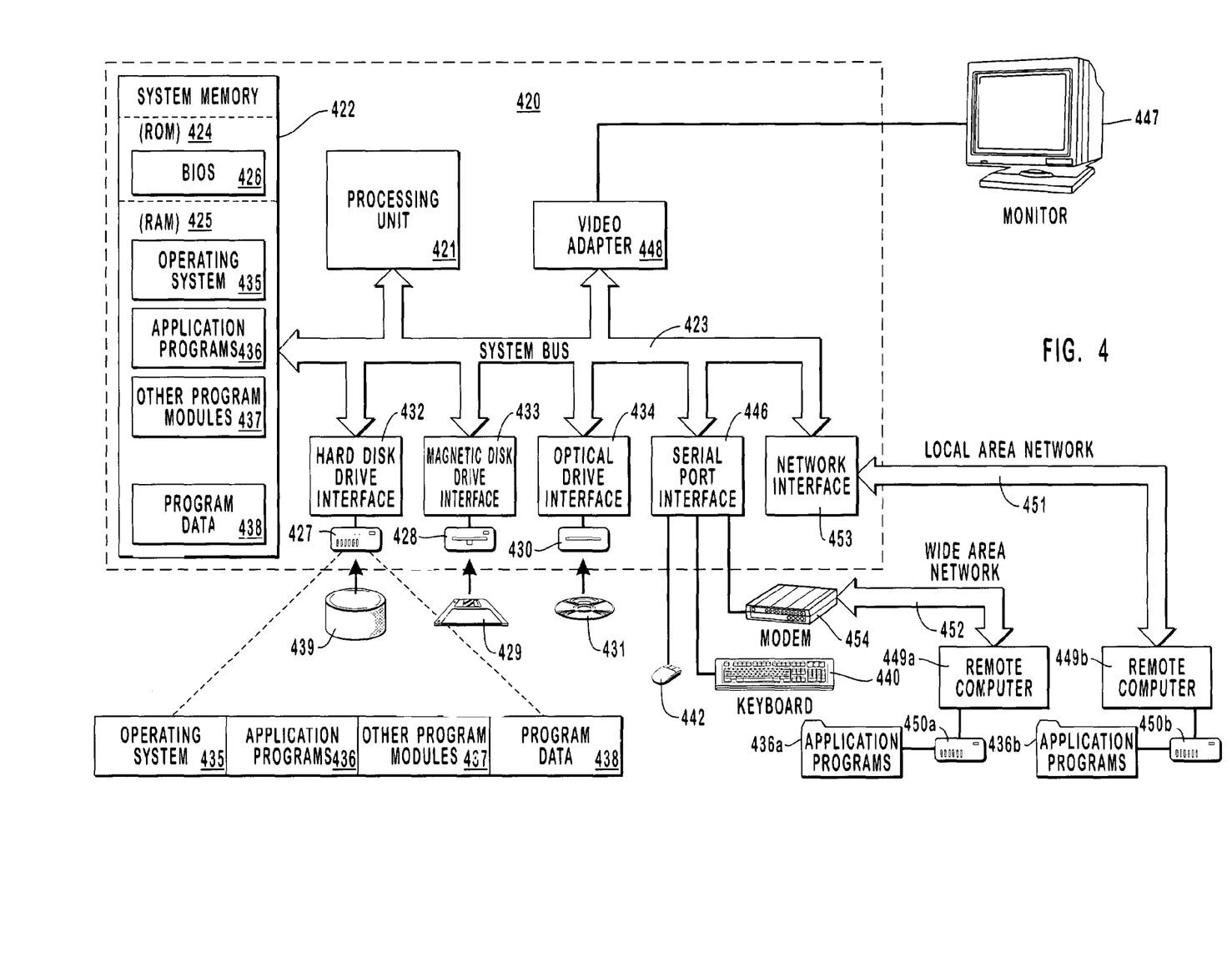
FIG. 4 illustrates an exemplary system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD-ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer system that supports a serialization engine capable of generating source code for objects, a method of serializing a plurality of objects from an initial representation to any of one or more subsequent representations, for one or more standard object types and serialization formats, and which may be extended to cover one or more custom object types and serialization formats, the method comprising acts of:

providing a serialization manager to (i) coordinate one or more standard serialization providers that each identify one or more standard serializers for a standard object type or serialization format, and (ii) load, as needed, one or more custom serialization providers that each identify one or more custom serializers for one or more custom object types or serialization formats that are not covered by the one or more standard serialization providers;

requesting a first serializer from the serialization manager for an object graph that comprises a root object and one or more other objects of particular object types, and for a particular serialization format, wherein the first serializer is requested from the serialization manager as part of a cut, copy or paste operation on the object graph, the first serializer serializing the root object to produce a new snippet of code sufficient to undo or redo a change in the object graph, the first serializer producing the snippet of code to include a new type definition;

requesting at least one other serializer from the serialization manger for the one or more other objects of the particular object types, and for a respective particular serialization format, wherein the at least one other serializer is requested from the serialization manager as part of the cut, copy or paste operation on the object graph, and such that due to the cut, copy or paste operation, the at least one other serializer produces an additional snippet of code sufficient to undo or redo a change to the object graph, the production of the code snippet preventing production of a new class representation of the one or more other objects of the object graph, such that instead of producing a new class representation comprising at least some portion of source code, a visual representation of the object graph is generated; and calling the serializer to serialize the object graph.

2. A method as recited in claim 1, wherein the first serializer is a custom serializer.

3. A method as recited in claim 2, wherein the serialization manager automatically loads the one or more custom serialization providers in response to the request.

4. A method as recited in claim 1, wherein the computer system also supports a visual user interface designer and the serialization engine is capable of generating source code for one or more user interface objects created within the visual user interface designer, the object graph comprising the one or more user interface objects.

5. A method as recited in claim 1, wherein the serialization manager maintains context information that can be shared among the one or more standard serialization providers and any custom serialization providers that are loaded by the serialization manager.

6. A method as recited in claim 1, wherein the initial representation comprises a representation used to persist the one or more user interface objects, and wherein the one or more subsequent representations comprise a representation used to represent the one or more user interface objects within the visual user interface designer.

7. A method as recited in claim 1, wherein the object graph comprises a plurality of related objects.

8. A method as recited in claim 1, wherein the one or more standard serialization providers are capable of identifying a plurality of serializers, and wherein at least two of the plurality of serializers are for serializing the object graph in different serialization formats.

9. A method as recited in claim 1, wherein the first serializer produces an eXtensible Markup Language representation of the object graph.

10. For a computer system that supports a visual user interface designer and a serialization engine capable of generating source code for user interface objects created within the visual user interface designer, a computer program product comprising one or more computer readable storage media having stored thereon computer executable instructions that implement a method of serializing one or more user interface objects from an initial representation to any of one or more subsequent representations, for one or more standard object types and serialization formats, and which may be extended to cover one or more custom object types and serialization formats, the method comprising acts of:

providing a serialization manager to (i) coordinate one or more standard serialization providers that each identify one or more standard serializers for a standard object type or serialization format, and (ii) load, as needed, one or more custom serialization providers that each identify one or more custom serializers for one or more custom object types or serialization formats that are not covered by the one or more standard serialization providers;

requesting a first serializer from the serialization manager for an object graph that comprises a root object and one or more other objects of particular object types, and for a particular serialization format, wherein the first serializer is requested from the serialization manager as part of a cut, copy or paste operation on the object graph, the first serializer serializing the root object to produce a new snippet of code sufficient to undo or redo a change in the object graph, the first serializer producing the snippet of code to include a new type definition;

requesting at least one other serializer from the serialization manger for the one or more other objects of the particular object types, and for a respective particular serialization format, wherein the at least one other serializer is requested from the serialization manager as part of the cut, copy or paste operation on the object graph, and such that due to the cut, copy or paste operation, the at least one other serializer produces an additional snippet of code sufficient to undo or redo a change to the object graph, the production of the code snippet preventing production of a new class representation of the one or more other objects of the object graph, such that instead of producing a new class representation comprising at least some portion of source code, a visual representation of the object graph is generated; and calling the serializer to serialize the object graph.

11. A computer program product as recited in claim 10, wherein the one or more custom object types or serialization formats are not covered by the one or more standard serialization providers.

12. A computer program product as recited in claim 10, wherein the first serializer is a custom serializer.

13. A computer program product as recited in claim 12, wherein the serialization manager loads the custom serializer in response to the request.

14. A computer program product as recited in claim 10, wherein the serialization manager maintains context information that can be shared among the one or more standard serialization providers and any custom serialization providers that are loaded by the serialization manager.

15. A computer program product as recited in claim 10, wherein the initial representation comprises a live representation used to represent the one or more user interface objects within the visual user interface designer, and wherein the one or more subsequent representations comprise a target representation used to persist the one or more user interface objects.

16. A computer program product as recited in claim 10, wherein the one or more custom serialization providers are capable of identifying a plurality of serializers, and wherein at least two of the plurality of serializers are for serializing the object graph in different serialization formats.

17. A computer program product as recited in claim 10, wherein the first serializer produces a source code representation of the object graph.

18. In a computer system that supports a visual user interface designer and a serialization engine capable of generating source code for user interface objects created within the visual user interface designer, a method of serializing a plurality of user interface objects from an initial representation to any of one or more extensible subsequent representations which may be extended to cover one or more custom object types and serialization formats, the method comprising steps for:
coordinating one or more standard serialization providers that each identify one or more standard serializers for a standard object type or serialization format;
loading, as needed, one or more custom serialization providers that each identify one or more custom serializers for one or more custom object types or serialization formats that are not covered by the one or more standard serialization providers;
identifying a first serializer for a particular serialization format and for an object graph that comprises a root object and one or more other objects of particular object types, the first serializer being identified as part of a cut, copy or paste operation on the object graph, the first serializer serializing the root object to produce a new snippet of code sufficient to undo or redo a change in the object graph, the first serializer producing the snippet of code to include a new type definition; and
identifying at least one other serializer that serializes the object graph as part of the cut, copy or paste operation on the object graph, such that due to the cut, copy or paste operation, the at least one other serializer produces an additional snippet of code sufficient to undo or redo a change to the object graph made within the visual user interface designer, the production of the code snippet preventing production of a new class representation of the one or more other objects of the object graph, such that instead of producing a new class representation comprising at least some portion of source code, a visual representation of the object graph is generated.

19. A method as recited in claim 18, wherein the particular object type comprises a custom object type.

20. A method as recited in claim 18, wherein the particular serialization format is a custom serialization format.

21. A method as recited in claim 18, further comprising a step for maintaining context information to be shared among the one or more standard serialization providers and any custom serialization providers that are loaded by the serialization manager.

22. A method as recited in claim 18, wherein the initial representation comprises a live representation used to represent the one or more user interface objects within the visual user interface designer, and wherein the one or more subsequent representations comprise a target representation used to persist the one or more user interface objects.

23. A method as recited in claim 18, further comprising a step for replacing a standard serializer with a custom serializer from a custom serialization provider loaded while identifying the first serializer for the object graph.

24. A method as recited in claim 18, wherein the object graph comprises a plurality of related objects.

25. A method as recited in claim 18, wherein the first serializer produces either a source code representation or an eXtensible Markup Language representation of the object graph.

26. For a computer system that supports a visual user interface designer and a serialization engine capable of generating source code for user interface objects created within the visual user interface designer, a computer program product comprising one or more computer readable media storage having stored thereon computer executable instructions that implement a method of serializing a plurality of user interface objects from an initial representation to any of one or more extensible subsequent representations which may be extended to cover one or more custom object types and serialization formats, the method comprising steps for:
coordinating one or more standard serialization providers that each identify one or more standard serializers for a standard object type or serialization format;
loading, as needed, one or more custom serialization providers that each identify one or more custom serializers for one or more custom object types or serialization formats that are not covered by the one or more standard serialization providers;
identifying a first serializer for a particular serialization format and for an object graph that comprises a root object and one or more other objects of particular object types, the first serializer being identified as part of a cut, copy or paste operation on the object graph, the first serializer serializing the root object to produce a new snippet of code sufficient to undo or redo a change in the object graph, the first serializer producing the snippet of code to include a new type definition; and
identifying at least one other serializer that serializes the object graph as part of the cut, copy or paste operation on the object graph, such that due to the cut, copy or paste operation, the at least one other serializer produces an additional snippet of code sufficient to undo or redo a change to the object graph made within the visual user interface designer, the production of the code snippet preventing production of a new class representation of the one or more other objects of the object graph, such that instead of producing a new class representation comprising at least some portion of source code, a visual representation of the object graph is generated.

27. A computer program product as recited in claim 26, wherein one or more custom serialization providers are loaded in identifying the first serializer for the object graph.

28. A computer program product as recited in claim 26, the method further comprising a step for maintaining context information to be shared among the one or more standard serialization providers and any custom serialization providers that are loaded by the serialization manager.

29. A computer program product as recited in claim 26, wherein the initial representation comprises a representation used to persist the one or more user interface objects, and wherein the one or more subsequent representations comprise a representation used to represent the one or more user interface objects within the visual user interface designer.

30. A computer program product as recited in claim 26, the method further comprising a step for replacing a standard serializer with a custom serializer from a custom serialization provider loaded while identifying the serializer for the object graph.

31. A computer program product as recited in claim 26, wherein the first serializer produces either a source code representation or an eXtensible Markup Language representation of the object graph.

32. For a computer system that supports a visual user interface designer and a serialization engine capable of generating source code for user interface objects created within the visual user interface designer, a computer program product comprising one or more computer readable storage media having stored thereon computer executable instructions that implement a method of efficiently serializing a plurality of user interface objects when performing visual operations on the one or more user interface objects, the method comprising steps for:
    loading one or more serialization providers that each identify one or more serializers for a given object type and serialization format;
    from the one or more serialization providers, identifying a first serializer capable of serializing a user interface object that comprises a root object and one or more other objects in a serialization format that corresponds to a requested visual operation to be performed on the user interface object, the first serializer being identified as part of a cut, copy or paste operation on the object graph, the first serializer serializing the root object to produce a new snippet of code sufficient to undo or redo a change in the object graph, the first serializer producing the snippet of code to include a new type definition; and
    identifying at least one other serializer that serializes the user interface object as part of a cut, copy, paste, undo or redo operation on the user interface object, such that due to the cut, copy, paste, undo or redo operation the at least one other serializer produces an additional snippet of code sufficient to undo or redo a change to the user interface object made within the visual user interface designer, the production of the code snippet preventing production of a new class representation of the one or more other objects of the user interface object in order to efficiently perform the requested operation, such that instead of producing a new class representation comprising at least some portion of source code, a visual representation of the object graph is generated.

33. A computer program product as recited in claim 32, further comprising a step for coordinating the one or more serialization providers.

34. A computer program product as recited in claim 32, wherein the one or more serialization providers comprise one or more standard serialization providers that each identify one or more standard serializers for a standard object type and serialization format.

35. A computer program product as recited in claim 34, wherein the one or more serialization providers comprise one or more custom serialization providers that each identify one or more custom serializers for one or more custom object types or serialization formats that are not covered by the one or more standard serialization providers.

36. A computer program product as recited in claim 35, wherein one or more custom serialization providers are loaded in identifying the serializer.

37. A computer program product as recited in claim 32, wherein the first serializer is a custom serializer.

38. A computer program product as recited in claim 32, the method further comprising a step for maintaining context information to be shared among the one or more serialization providers.

39. A computer program product as recited in claim 32, the method further comprising steps for:
    from the one or more serialization providers, identifying a code serializer capable of serializing a user interface object in a serialization format that corresponds to a source code representation of the user interface object; and
    serializing the user interface object with the identified code serializer to produce a class representation of the user interface object.

40. A computer program product as recited in claim 32, the method further comprising steps for:
    from the one or more serialization providers, identifying an eXtensible Markup Language (XML) serializer capable of serializing a user interface object in a serialization format that corresponds to an XML representation of the user interface object; and
    serializing the user interface object with the identified XML serializer to produce an XML representation of the user interface object.

* * * * *